Patented Jan. 15, 1929.

1,699,368

UNITED STATES PATENT OFFICE.

JOHN McGAVACK, OF JACKSON HEIGHTS, NEW YORK, AND ROY A. SHIVE, OF WILMINGTON, DELAWARE, ASSIGNORS TO THE NAUGATUCK CHEMICAL COMPANY, OF NAUGATUCK, CONNECTICUT, A CORPORATION OF CONNECTICUT.

METHOD OF PRESERVING RUBBER LATEX AND PRODUCT THEREOF.

No Drawing. Application filed April 8, 1927. Serial No. 182,174.

It has generally been recognized that rubber latex at the time of its exudation from the tree has an alkaline reaction which very speedily changes to an acid reaction. To preserve latex in an uncoagulated condition it has been customary to maintain the latex in an alkaline state by the addition of an alkali or basic substance. This art of preserving latex by maintaining an alkaline condition therein has been known for a good many years and has been regarded as the only means whereby uncoagulated rubber latex can be safely shipped from the plantation countries to manufacturing countries. The bulk of such preserved latex contains ammonia as the alkaline substance or preservative or stabilizer. It has never been possible, and in fact has never been suggested that latex may also be preserved against all semblance of coagulation and yet shown an acid reaction.

The present invention is concerned with the preparation of what may be briefly termer a stable acid latex. The invention aims to provide methods for treating latex to render it stable both at the neutral point and on the acid side of neutrality. The invention further includes means for treating rubber latex so that it will, when converted into rubber, furnish a product of high plasticity, improved rate of drying, and enhanced cohesiveness. The invention further aims to provide a stable latex adapted for use where a latex having a slightly acid reaction is desirable or necessary.

Briefly stated the invention consists in treating rubber latex with an agent capable of stabilizing the latex and preventing its coagulation at the neutral point as well as on the acid side of neutrality, and with an agent which will carry the reaction to the acid side of neutrality. The invention includes within its scope the treatment of natural rubber latex as it is received after tapping, as well as latex which has been preserved by means of the addition of an alkaline preservative, stabilizer, etc. Although particular embodiments are given, it is with the understanding that these are to be regarded in the light of examples, and not as limitations.

As one illustration of the invention, 1000 ccs. of natural latex are treated with 3-5 grams of the reaction product of cinnamic acid, butyl alcohol and sulphuric acid or chlor sulphonic acid. To the latex is also added 10-15 ccs. of 38% formaldehyde solution. This latex is stable and has an acid reaction.

When treating ammonia preserved latex instead of natural untreated latex, it is necessary to remove the ammonia or nullify its effect. This may be accomplished by air blowing, by neutralizing, by precipitating the hydroxyl ions as insoluble hydroxides, formation of complex compounds with the ammonia or in any other suitable method. Prior to the disposal of the ammonia, or simultaneously therewith, 5 to 10 grams of the reaction product of para cresol and oleic acid obtained in the presence of sulphuric or chlorsulphonic acid are added per thousand ccs. of 38% latex. After the addition, the ammonia may be removed by an air blowing treatment. After this has been completed the latex is then treated with about 40 ccs. of 38% formaldehyde. The product is a suitable latex having an acid reaction, that is its pH may vary between 4.5 and 7, depending upon the amount of formaldehyde added.

Instead of blowing as a method of removing the ammonia, the latter may be neutralized with a weak acid such as acetic acid or boric acid and the addition of the acid continued until the proper hydrogen ion concentration has been reached, or is increased above $1 \times 10^{-7}$. In this instance an appreciable quantity of salts will be formed as a result of the reaction of the acid and the ammonia, and care must be taken to have a sufficient amount of the stabilizer agent present when the acid is introduced. Otherwise the salts formed will ionize and tend to disturb the latex equilibrium. In cases where salt formation, and the presence of salts in the latex constitutes no disadvantage in any subsequent use of the latex, the neutralizing treatment is quite satisfactory. Where, however, it is not desirable to have inorganic salts thus formed, formaldehyde may be added to the ammonia latex instead of the acetic acid or other acid. In this instance the amount of formaldehyde should be sufficient to react with the ammonia and to give the desired hydrogen ion concentration. By this method, the latex may be brought to a very strong acid concentration, or at least to a point as low as pH 4.5. To illustrate more specifically, 1000 ccs. of ammonia preserved latex containing 36% of rubber are treated with 8 grams of the reaction product obtained from the condensation of butyl alcohol with cinnamic acid in the presence of sulphuric acid. To the latex are added 30–35 ccs. of 36% formaldehyde solution. It is believed that the ammonia reacts with part of the formaldehyde to form hexamethylene tetramine. A portion of the formaldehyde may react with the proteins in the latex to dispose of the free amino groups by adding them together in a methylene linkage structure thus freeing the carboxyl groups of the proteins. It is to be understood, however, that these reactions are suggested explanations of what might take place, and the merits of the invention are not dependent upon the correctness or incorrectness of the above theory.

The products obtained in accordance with the above examples may be generally termed as stable acid latices. Their major properties are in most respects the same as those of alkaline preserved latex. There are, however, important distinctions besides the acid reaction. These acid latices have the property of drying more rapidly when spread on a surface than ammonia preserved latex, and they give a film which is less tough, in other words has more of the "rubber" property. The magnification of the rubber property may be due to the fact that changes are wrought upon the non-rubbers, presumably the proteins, which are known to lack the elasticity of the rubber hydrocarbon. Regardless of what takes place, the fact remains that rubber films and coatings derived from stable acid latex dry more rapidly, absorb less water, and are more rubbery than films or layers of rubber derived from ammonia preserved or other alkaline treated latex.

It becomes apparent, in view of the above, that a new class of stabilizing agent or preservative has been discovered. This class includes the Twitchell type of compound. Stabilizing agents of the kind mentioned in the above examples may be obtained by the sulphonation of aromatic phenols and hydrocarbons, in the presence of unsaturated aliphatic acids. These reaction products may be powder like or oil like masses. More specifically, one such stabilizing agent may be made by treating para cresol and oleic acid with sulphuric acid or chlor sulphonic acid. Other types of stabilizing agents comprise aromatic acids sulphonated in the presence of aliphatic alcohols, one illustration of which has been given in one of the above examples. Other materials which may be used to stabilize latex on the acid side of neutrality are the reaction products obtained by condensing aromatic hydrocarbons such as anthracene, naphthalene, etc. with aliphatic alcohols, such as propyl, iso propyl, butyl, amyl, in the presence of sulphuric acid, chlor sulphonic acid or fuming sulphuric acid. It is of course understood that some of these compounds will have a greater stabilizing effect than others, and it may be necessary to use greater amounts of some of them. Consideration must also be taken of the fact that the latex itself may vary somewhat, due to fluctuations in ammonia content, condition of the proteins and the seasonal differences etc. Adjusting the percentage of stabilizing agent, however, is a simple matter of using more or less of the agent, as required.

Instead of formaldehyde solution in the above examples, dilute acetic acid (5–10% or other dilutions) may be added to the latex containing the acid stabilizing agent. Other weak acids may be used, including any such acid whose pH is not greater than that of acetic acid. Salts which hydrolyze to give an acid reaction may also be employed especially in those instances where the presence of salt-forming radicals is not objectionable, and in instances where it is desired to introduce some salt or radical.

The stable acid latex prepared according to any of the above examples may be used as such in cases where it is desired to have an acid reaction. The latex may be converted into rubber by coagulation, drying, or spraying, etc. The rubber thus produced is considerably more plastic on the mixing mill than rubber similarly prepared from alkaline preserved latex. This improvement is especially noticeable in contrast with rubber derived from latex preserved with a non-volatile alkali. In instances where it is desired to form a stable acid latex from a latex which has been preserved with a non-volatile alkali or alkaline material, it may of course be impossible to avoid having an increased percentage or salts, such as those resulting from neutralizing the alkaline compound.

In the appended claims the word "uncoagulated" is used to indicate the absence of any coagulation, and the expression excludes those partial stages of coagulation which are not visible to the naked eye, but may be clearly seen under a microscope. The word "uncoagulated" is used as signifying the absence of any coagulation. The stabilizing agents are defined in the claims as sulphonic alkyl aryl reaction products and this term is to be understood as generic to the reaction products described above and including sulphuric, sulphonic or chlorsulphonic reaction products of alkyl and aryl hydrocarbons, alcohols and acids. The word "sulphonic" is used as descriptive of the reaction product, although it is understood that the products need not and may not necessarily be strictly sulphonates.

Having thus described our invention, what we claim and desire to protect by Letters Patent is:

1. As a new product a stable uncoagulated rubber latex having a pH between 7 and 4.5 and containing an organic preservative capable of exerting its effect on both sides of neutrality.

2. As a new product a stable uncoagulated latex containing a sulphonic alkyl aryl reaction product as a stabilizer, and containing a small amount of an acid.

3. As a new product a stable uncoagulated latex containing a sulphonic alkyl aryl reaction product as a stabilizer, and containing a small amount of a weak acid.

4. As a new product a stable uncoagulated latex containing a sulphonic reaction product of an aliphatic alcohol and a cyclic hydrocarbon, and containing a small amount of a weak acidic material.

5. As a new product a stable uncoagulated latex containing a sulphonic reaction product of cinamic acid and butyl alcohol, and containing a small amount of a weak acidic material.

6. As a new product a stable uncoagulated latex containing a sulphonic alkyl aryl reaction product as a stabilizer, and containing formaldehyde.

7. As a new product a stable uncoagulated latex containing a sulphonic reaction product of an aliphatic alcohol and a cyclic hydrocarbon, and containing formaldehyde.

8. As a new product a stable uncoagulated latex containing a sulphonic reaction product of cinamic acid and butyl alcohol, and containing formaldehyde.

9. A method of treating latex which comprises adding an agent to stabilize the latex in the vicinity of the neutral point, adding an acidic material thereto to carry the reaction of the latex to the acidic side of neutrality to produce a stable uncoagulated acid latex.

10. A method of treating latex which comprises treating latex with an agent capable of stabilizing the latex on the acid side of neutrality, adding a weak acidic material in an amount sufficient to impart a pH of less than 7, to produce a stable uncoagulated latex having a pH of less than 7.

11. A method of treating latex which comprises treating latex with a sulphonic alkyl aryl reaction product and an acidic material to furnish a stable uncoagulated latex having a pH less than 7.

12. A method of treating latex which comprises treating latex with a sulphonic reaction product of an aliphatic alcohol and a cyclic compound and a small amount of an acid material to give a pH in the latex less than 7.

13. A method of converting stable uncoagulated alkaline latex into a stable uncoagulated acid latex which comprises treating said alkaline latex with a stabilizer capable of functioning on either side of neutrality, nullifying the effect of the alkaline preservative, and treating said latex with an acidic material to impart a pH less than 7.

14. A method of converting stable uncoagulated alkaline latex into a stable uncoagulated acid latex which comprises treating said alkaline latex with a sulphonic alkyl aryl reaction product, disposing of the alkaline preservative, adding an acidic material in an amount sufficient to impart a pH to the latex of less than 7 and greater than 4.5.

15. A method of converting stable uncoagulated alkaline latex into a stable uncoagulated acid latex which comprises treating said alkaline latex with a sulphonic alkyl aryl reaction product, disposing of the alkaline preservative by treating the latex with an acidic material capable of reacting with the alkaline preservative to neutralize its effect, said acid material being in a quantity sufficient to impart to the latex a pH less than 7.

Signed at New York, county and State of New York, this 14th day of March, 1927.

JOHN McGAVACK.

Signed at Wilmington, county of New Castle, State of Delaware, this 19th day of March, 1927.

ROY A. SHIVE.